United States Patent [19]

Zingher et al.

[11] Patent Number: 5,409,200
[45] Date of Patent: Apr. 25, 1995

[54] PRINTED-CIRCUIT-LIKE ARRAY OF SPRINGS WITH NON-LINEAR FORCE VS DEFLECTION

[76] Inventors: Arthur R. Zingher, 107 N. Broadway, Apt. 211, White Plains, N.Y. 10603; Anthony J. Liberko, 216 Fifth Ave. S.W., Hutchinson, Minn. 55350

[21] Appl. No.: 131,019

[22] Filed: Oct. 1, 1993

Related U.S. Application Data

[63] Continuation of Ser. No. 847,703, Mar. 5, 1992, abandoned.

[51] Int. Cl.⁶ .............................................. F16F 1/18
[52] U.S. Cl. ................................... 267/160; 267/80; 267/182
[58] Field of Search .............. 267/148, 158, 159, 160, 267/164, 165, 181, 80, 163; 248/618, 622, 626, 633; 293/120, 133, 135; 200/5 A

[56] References Cited

U.S. PATENT DOCUMENTS

| | | | |
|---|---|---|---|
| 1,037,729 | 9/1912 | Collins | 267/165 |
| 2,571,170 | 10/1951 | Stillwell, Jr. | 267/159 |
| 3,065,288 | 11/1962 | Smith et al. | 267/164 |
| 3,495,816 | 2/1970 | Lyle | 267/158 |
| 3,506,295 | 4/1970 | Yancey | 293/133 |
| 3,638,254 | 2/1972 | Falkenau | 5/476 |
| 3,879,025 | 4/1975 | Dillard | 267/165 |
| 3,930,665 | 1/1976 | Ikawa | 293/133 |
| 4,002,315 | 1/1977 | Van Gougbergen | 248/633 |
| 4,116,503 | 9/1978 | Licht | 308/9 |
| 4,371,226 | 2/1983 | Brancaleone | 339/147 |
| 4,778,157 | 10/1988 | Thomas | 267/103 |
| 4,862,351 | 9/1989 | Wells | 267/103 |
| 4,895,352 | 1/1990 | Stumpf | 5/476 |
| 5,013,013 | 5/1991 | Spedding | 267/165 |
| 5,165,125 | 11/1992 | Callaway | 267/80 |

FOREIGN PATENT DOCUMENTS

| | | | |
|---|---|---|---|
| 2-53023 | 10/1990 | Japan | 267/158 |
| WO85/00207 | 11/1985 | WIPO | |
| WO87/00252 | 1/1987 | WIPO | |

OTHER PUBLICATIONS

Automotive Engineering, Feb. 1986, pp. 113–116.
"Creative Design With Thermoplastic Elastomers", by Thomas W. Sheridan Mar./Apr. 1989, Plastics Deisgn Forum.
"Lightweight Composite Core for Curved Composite Mirrors", by C. Porter P. Jacoy, W. Schmitigal (report prepared by C. J. Morrissey) Jun. 1991, Jet Propulsion Laboratory, Invention Report #NPO-17858/7353.

Primary Examiner—Robert J. Oberleitner
Assistant Examiner—Chris Schwartz
Attorney, Agent, or Firm—Faegre & Benson

[57] ABSTRACT

A thin sheet of metal is patterned, folded, and joined to produce an array of compression springs, each of which exhibits constant force characteristics over a useful range of deflections to allow the array to apply nearly constant specified forces to closely spaced items which may be of varying size or height. As the springs are loaded from a relaxed state, the rate of force increase per unit of increased deflection is initially high, tapering off to nearly zero force increase with subsequent increases in deflection. This region of minimal force increase per unit of increased deflection (i.e. a "near constant force" band) extends over a useful range of deflections. The springs are self guiding and balanced, producing no lateral force on a perpendicularly applied load.

23 Claims, 6 Drawing Sheets

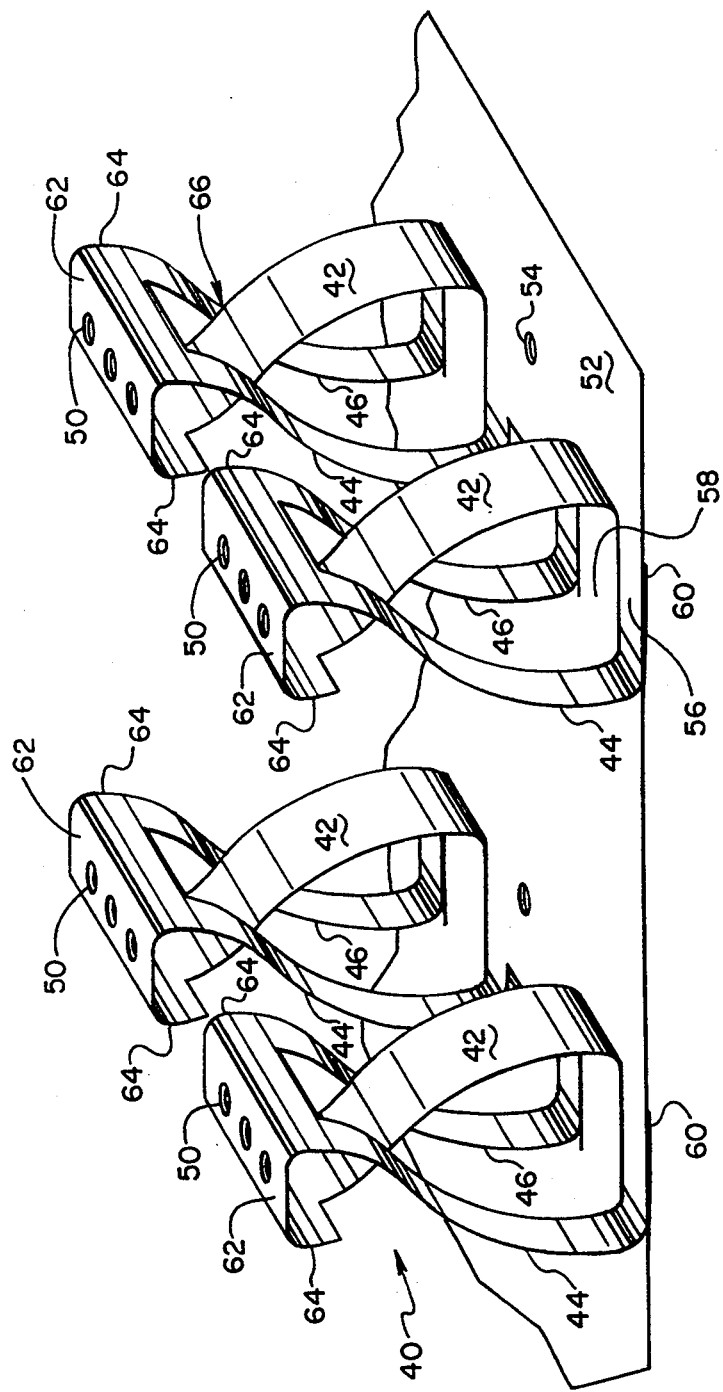

PRINTED-CIRCUIT-LIKE ARRAY OF SPRINGS WITH NON-LINEAR FORCE VS DEFLECTION

This is a continuation of application Ser. No. 07/847,703, filed on Mar. 5, 1992, abandoned.

BACKGROUND OF INVENTION

This invention consists of two distinct themes:
- a buckling slender column used as a spring with nearly constant force; and
- a printed circuit array of springs, particularly non-cantilever or non-planar springs.

In some current electromechanical applications there is a requirement for an array of springs which can exert near-constant force over a considerable range of deflection. In varying applications a single spring element may be utilized. In other representative applications the springs may be closely spaced in an array consisting of 2 rows by 2 columns for a total of 4 spring elements, up to and possibly exceeding 15 rows by 15 columns, for a total of 225 spring elements. The requirements also provide that the end product be simple in design, easily manufacturable, and possess the desired non-linear properties.

This invention thus provides a printed circuit of springs which integrates a dense array of many functionally distinct springs into one thin metal sheet. The sheet is folded so individual springs protrude perpendicularly from the sheet. An individual spring has multiple columns which bend by buckling during deflection (compression). For a significant range of deflection, the spring force is nearly constant, and there is minimal lateral sideways force and displacement.

A dense array of numerous discrete springs according to previous technology imposes a penalty in complexity, fabrication, assembly and cost. By contrast, a goal of this present invention is to improve simplicity, fabrication, assembly and cost.

It is known that a collimated beam axially loaded will initially be stiff until sufficient lateral deflection of some portion of the beam occurs to cause the member to "buckle", creating a drastic change in deflection per additionally applied load. Building upon that principle, it has been discovered that two centrally joined opposing flat beams, having a slightly outward bowed cross section could exert a nearly constant axial force over a relatively large range of displacements, and the coupling of the beams allows the opposing forces to cancel any lateral displacement of the central axis, but act additively to exert a constant force against the perpendicularly applied load.

It was discovered that variations in the basic parameters of thickness, material type, and width of legs will alter the spring rate. Varying height and selectively removing material to balance internal stresses upon deflection produces an extended near-constant-force band.

Testing of this invention has shown that the unitary array design greatly improves manufacturability over prior art designs utilizing discrete components such as a series of coil springs, and the unitary design also offers a substantially higher spring rate than would a comparably sized cantilever spring occupying the same volume.

Standard coil and cantilever springs produce a linear or extra-linear increase in force with deflection while the opposite—a sub-linear increase in force with deflection—has been found to be true for the buckling beam type spring of the present invention.

Although the spring array was designed to serve a specific purpose, the versatility of design and performance characteristics suggest numerous application; some using existing designs and others using modified designs.

DESCRIPTION OF THE DRAWINGS

FIG. 3 is a perspective view of a portion of an array of springs according to a second embodiment of the invention;

DETAILED DESCRIPTION OF THE INVENTION

Figure 1:
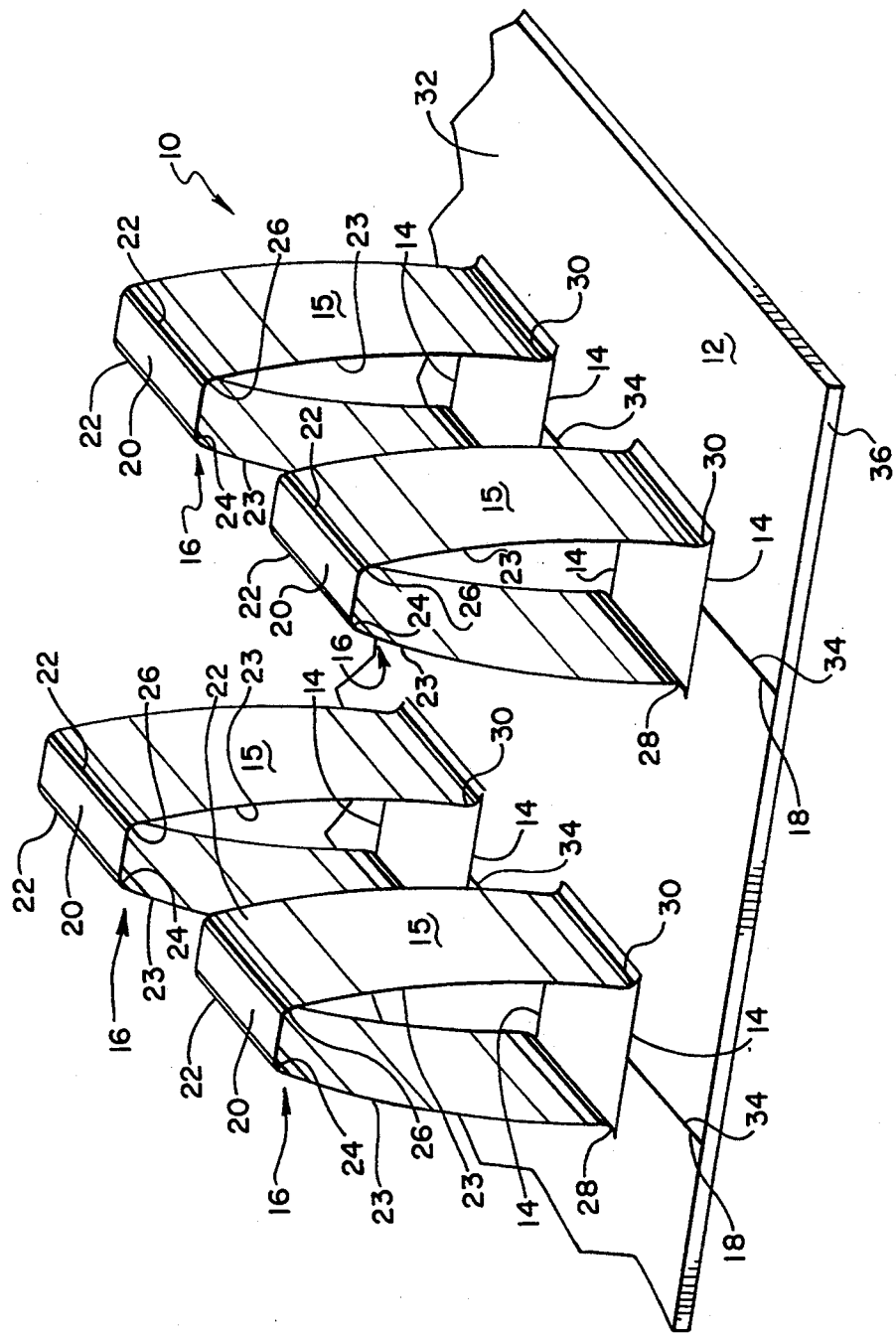
FIG. 1 is a perspective view of a segment of an array of springs according to a first embodiment of the invention.

FIG. 1 depicts a first embodiment 10 of the basic spring array design. The design consists of a series of arched leaf springs. A unitary sheet 12 of appropriate material is patterned and formed to produce an array of springs.

The fabrication process consists of first selectively removing material to form the necessary pattern from material having the desirable properties, including high spring rate. The material should be laid out such that bend lines will not fall parallel to the grain direction of the material, and ideally will fall 90 degrees to the grain direction.

Critical to the performance of the springs of the present invention is that the spring force must be produced by the entire length of the side member or leg and not concentrated to a small portion of the leg. To achieve this, it is imperative that the profile of the legs be a gradual arc with no abrupt form changes or defects in the active region. Because of the high spring rate of the selected material, it would be difficult to repeatedly obtain a large precision formed radius. A natural bow is produced in the straight region of the leg at the time of assembly, coerced by the higher stresses present at the upper and lower radii 24, 26, 28, and 30, and the subsequent conversion of angles from obtuse to acute and from acute to obtuse respectively.

Figure 7:
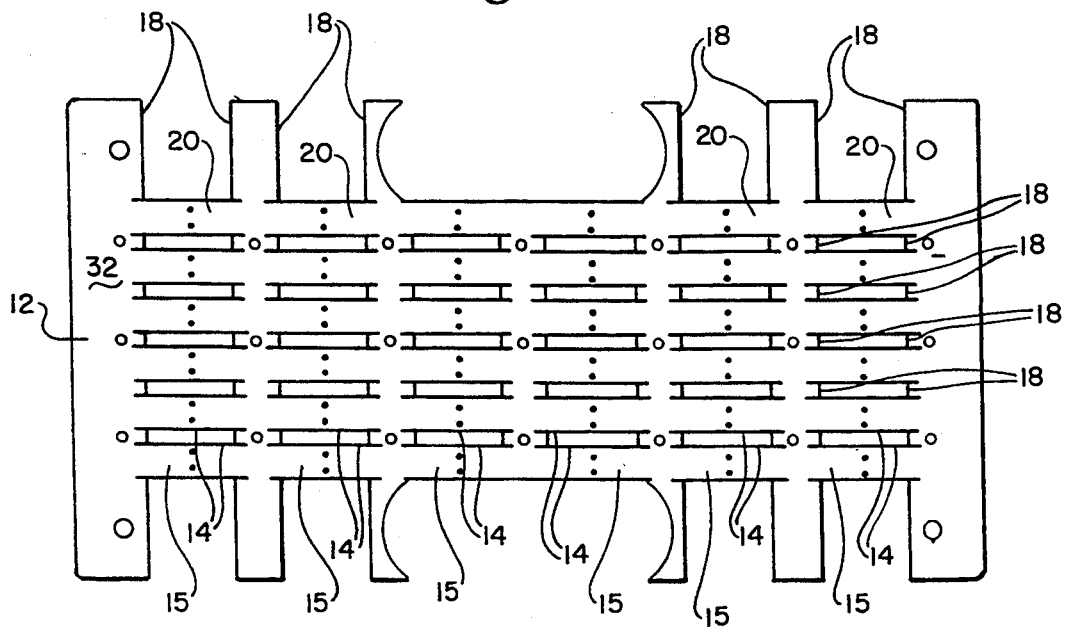
FIG. 7 illustrates a flat sheet for forming and array of 6 rows and 6 columns of springs, similar to those of FIG. 1.
Figure 8:
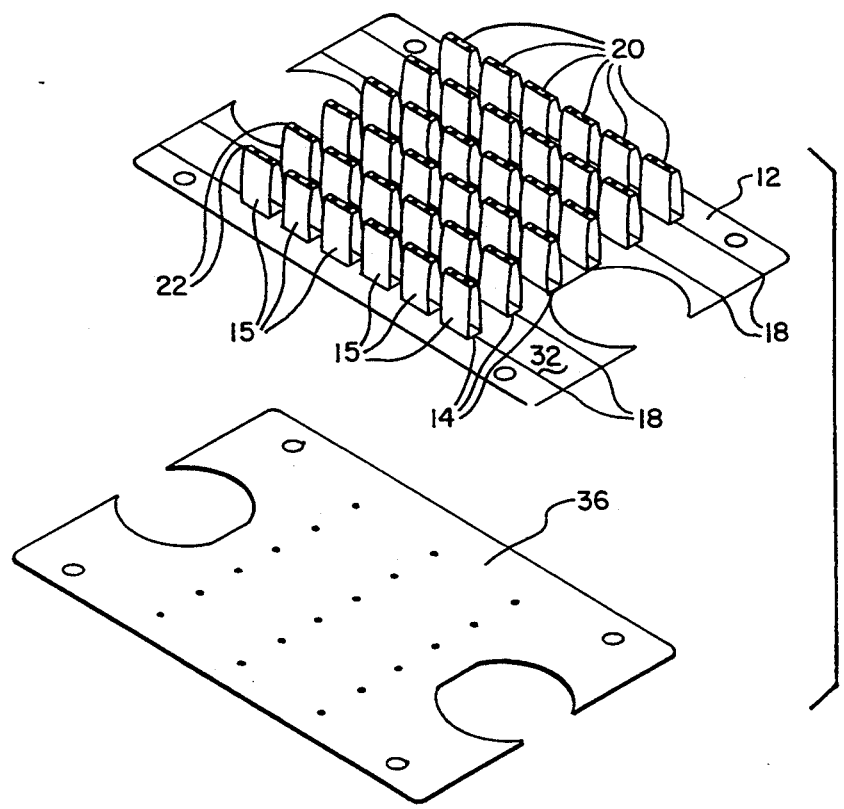
FIG. 8 is an isometric view of an array of 6 rows and 6 columns of springs formed from the flat sheet of FIG. 7.

Forming of the structure of the springs is accomplished in three stages. The initial forming is done on precision forming dies. This step serves to form the four radii on each row of parts, one complete row at a time. Forming in accordance with the preferred embodiment of the present invention is symmetrical about the central vertical axis. The top two radii 24, 26 provide a gradual transition from the flat top portion to the side members or legs. The bottom radii 28 and 30 are formed opposite the top two. When completed, the cross section shows substantially vertical side walls projecting upwardly from a base portion and topped by a short portion, parallel to the base, the appearance of which can be said to resemble a top hat. The second forming stage establishes a natural bow in the legs of the springs and occurs when the bases of each spring are secured into position, changing the obtuse formed upper angles to acute angles and the acute formed lower angles to become obtuse angles. The bow occurs because the internal stresses in the die formed radii have a greater resistance to deformation than the unformed sides, causing the sides to displace. This assures the largest possible radius for the most desirable performance. The third stage of forming involves deliberately over-stressing the spring by deflecting it to its maximum practical deflection which induces residual stresses favorable for consistent performance in a commonly used method called cold-setting. Further understanding of the method of forming the spring array of the present invention will be facilitated by reference to FIG. 7, which illustrates a flat sheet patterned and cut preparatory to forming into an array of 6 rows by 6 columns of elements, similar to those of FIG. 1. FIG. 8 illustrates the sheet of FIG. 1 folded and formed into the final array.

Referring to FIGS. 1, bands 15 project upwardly from the face of sheet 12 and are formed into springs 16. In order to provide the bands, a first plurality of pairs of parallel slits 14 are cut into the surface of sheet 12. The separation of the pairs of slits 14 corresponds to the width of the bands 15 and the spacing between adjacent bands alternately that are later formed into individual springs 16. A second plurality of slits 18, oriented perpendicular to the first slits 14 are cut between adjacent springs 16 and between the end springs in a row and the edge of the sheet of material 12. A portion of the material between the slits 18 is removed and the edges are bonded together using appropriate bonding techniques. A backing plate 36 may be optionally added for stability. Any commonly used method may be used for securing the joint, such as adhesive bonding, resistance welding, brazing, or energy beam welding.

Altering various geometric and material parameters will affect the spring rate, the force-deflection curve, or both. The following criteria all seem to apply:

Thickness: Proper material thickness is essential to obtaining a large near-constant-force band. The higher the ratio of height to thickness, the longer the near-constant-force band. A ratio of 150:1 performed satisfactorily on test parts.

Width of Leg: Increasing the width of the legs will increase the force. Because more force is delivered per unit of deflection, the force-deflection curve will be steeper, and the near-constant-force region will shrink. It should also be noted that two separate legs whose sum of widths is equal to a solid, wider leg, will not deliver the same amount of force because of internal reactive stresses.

Height: As stated previously, the height to thickness ratio is an important parameter for maximizing the near-constant-force band. The ratio of height to width is not definitive, but ratios between 1.5:1 and 4:1 have performed satisfactorily on test parts. If the height is too short, the member will have limited travel and be very stiff. If the height is too tall, the member will be unstable. The greater the height, the longer the near-constant-force band will be. Taller legs will also require greater spacing as their lateral displacement is greater.

Cross Sectional Geometry: By selectively removing material from the face of the legs in low stress areas causing a redistribution of stresses to a more balanced state, it is possible to improve performance, remaining in the near-constant-band for longer periods of time.

It should be noted that, with respect to the parameters of thickness, leg width, height and cross-sectional geometry, the specific figures mentioned above merely represent those used satisfactorily in test parts. These figures are not to be considered optimum, and numerous values may be expected to function in a fully satisfactory manner.

A planar, load-contacting top portion 20 has a pair of parallel side radii 22 as shown. Top portion 20 is blended with the outwardly bowed downwardly extending side members 23 by the complementary convex obtusely formed top radii 24 and 26. Side members take on a naturally occurring outward bow due to the nature of the material and the forming steps, particularly the forming of radii 24 and 26 and the radii 28 and 30 merging the side members 23 into planar, spring supporting base 32. Radii 28 and 30 are brought into close proximity, especially when the entire assembly is to be joined to backing plate 36.

When a load is applied downwardly to a completed spring array, perpendicular to base 32, each spring deflects and exerts an equal resistance force oriented opposite in direction to the applied load vector. During deflection, the central portions of side members 23 between the distal and proximal portions also displace laterally from each other.

Figure 2:
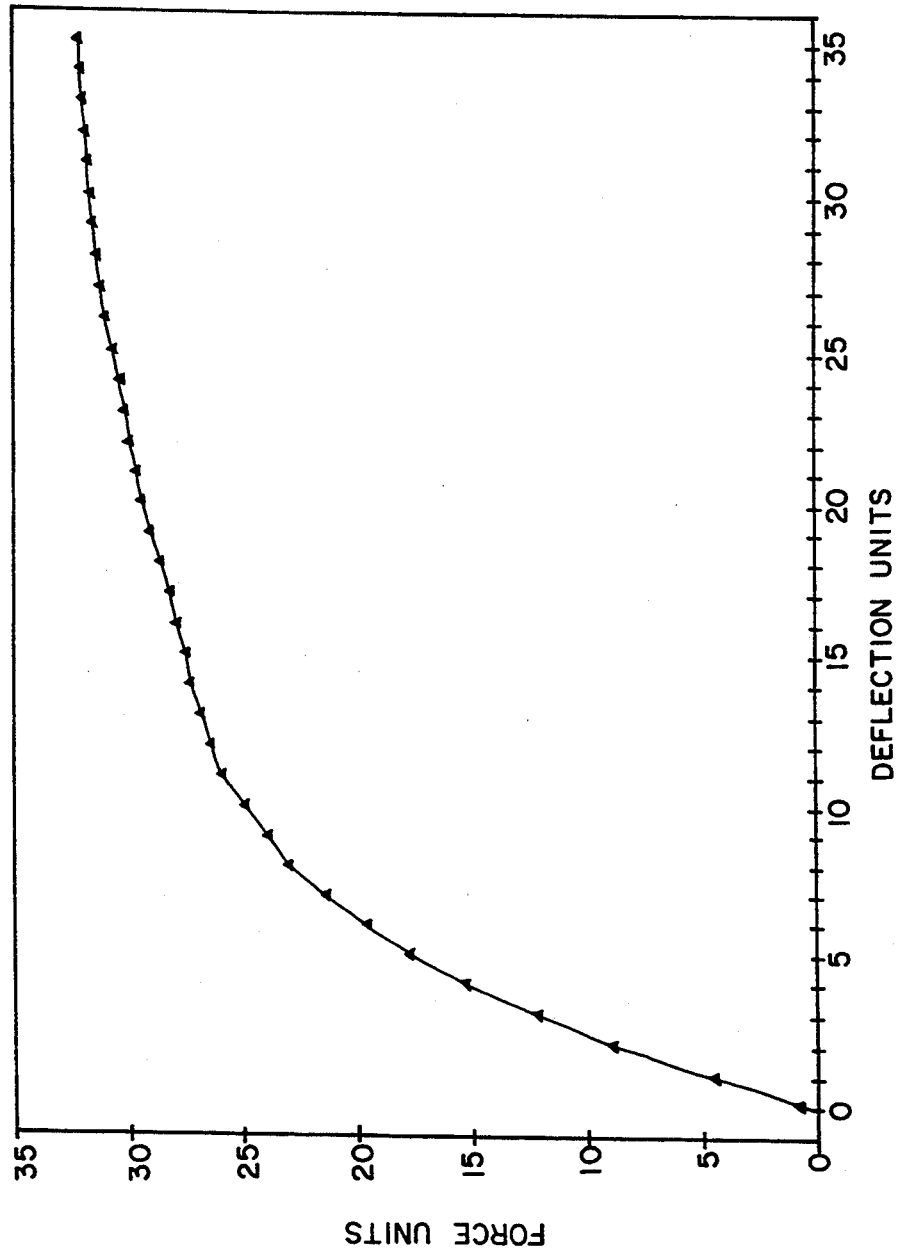
FIG. 2 illustrates a typical force vs deflection curve of a spring constructed in accordance with the present invention.

As can be determined from the graph in FIG. 2, the amount of force required to achieve an initial displacement of the spring is large but begins to taper to a near constant force as deflection increases once the deflections are in the near constant force band where the slope of the force vs. deflection curve is essentially flat.

As compressive force is axially applied, the spring will exhibit a large increase in force per unit of deflection initially, smoothly transitioning to a large increase in deflection per unit of applied force, giving us a usable near-constant-force band spanning approximately 50% of the designed deflection range.

The axially applied force causes a decrease in spring height and causes a lateral deflection in the side members or legs of the spring. Any interference with these legs will alter the performance.

In an effort to minimize lateral displacement of the spring during deflection, the springs may also be constructed in accordance with a second embodiment as illustrated in FIG. 3. The side members of the first embodiment were modified as shown in such a way as to maintain symmetrical, balanced forces. The left-hand leg and right-hand leg are subdivided into four equal vertical sections with the outer two removed from the left-hand side and the center two removed from the right-hand side. The base of the legs are then moved toward each other until the left-hand center leg passes between the right-hand legs. The feet are then secured in this cross leg design. During deflection, each of the legs deform into a compound "S" shape, minimizing the outward deflection. The force/deflection curves are very similar to the basic design.

One side member of each spring 40 consists of a central leg 42 whose width is equal to slightly less than one-half the total width of spring 40. This minimal downsizing is necessary to provide for clearance between the interleaved legs. The other side member consists of two legs 44 and 46 which each have a width approximately equal to one-half the width of central leg 42. Top portion 62 may contain openings 50 for tool location or the passage of fluids or gas.

Figure 4A:
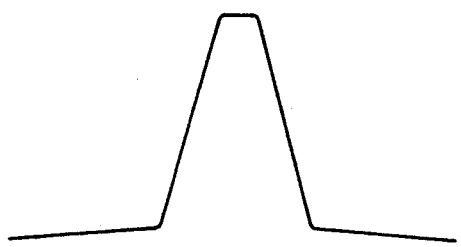
FIGS. 4a and 4b illustrate the profile of springs constructed in accordance with the second embodiment of the invention in the configuration as initially formed and in the fully assembled form.
Figure 4B:
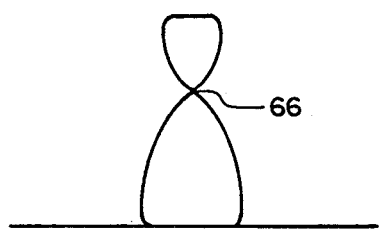

Interleaving is possible when the base 52 is allowed to overlap itself. The complex formed shape is obtained by performing three method steps. First, the spring is formed into its initial formed profile as shown in FIG. 4a. The base 52 is then secured via tooling holes 54 and base portions 56 and 58 brought together until they pass through each other, legs 42, 44, and 46 overlapping base 52, forming a cross-over point 66. Base 52 is then secured to itself at points where it overlaps itself 60. For increased strength and stability, the legs 42, 44, and 46 do not directly join the top portion 62 but instead join a short transition sidemember 64, spanning the entire width. With this design, lateral displacement of the spring when fully displaced is reduced by 33–50%. The constancy of the spring force is slightly lower than is that of the first embodiment apparently because the complex deflection occurs over shorter length buckled side members rather than the longer ones of the first embodiment.

Figure 5:
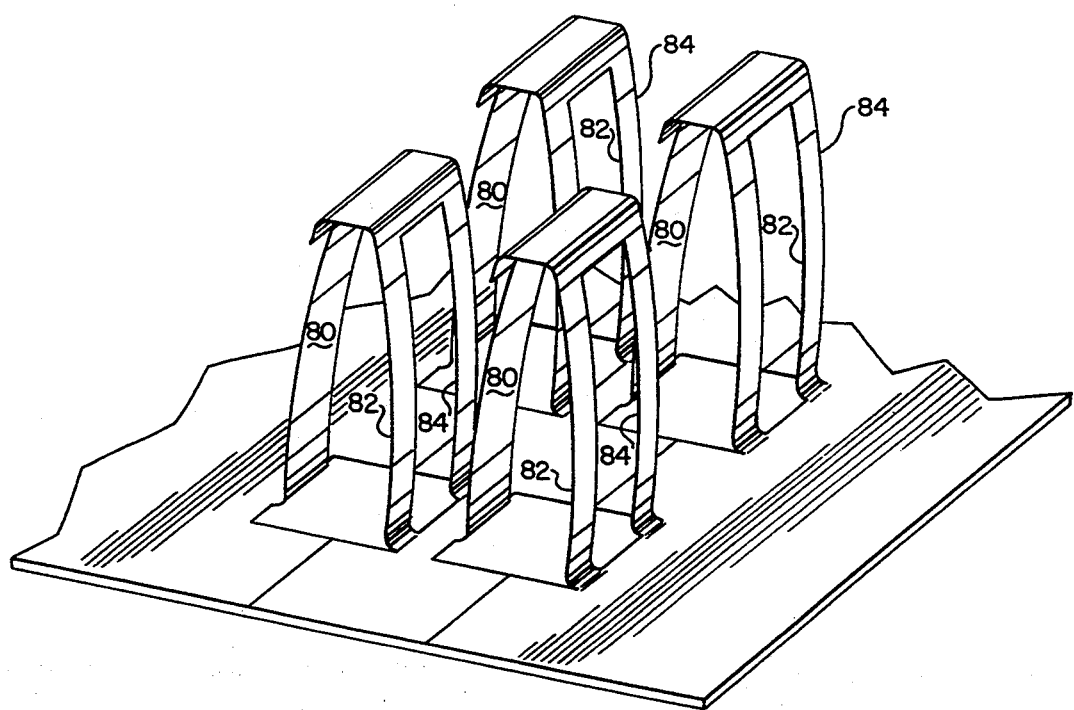
FIG. 5 is a perspective view of a segment of an array of springs constructed in accordance with a third embodiment of the invention.

In the event that performance comparable to that of the first embodiment is required for more densely packed springs on smaller center-to-center distances, the split leg design of the second embodiment can be formed with each of the springs in the same non-interleaved fashion as the standard design of the first embodiment to yield a high density version as shown in FIG. 5. To achieve this, the right-hand and left-hand side members are divided vertically into 4 equal segments with allowance for clearance between intermeshing portions. The middle two segments are removed on the right-hand side while the outer two segments are removed from the left-hand side. The central leg portion 80 of the left-hand side is then allowed to intermesh between the two outer parallel legs 82 and 84 of the adjacent spring. Adjustments will need to be made in part geometry to compensate for the lower spring force due to reduced cross sectional area compared to the first embodiment. When compressed, the central legs 80 will interleave with the outer parallel legs 82 and 84 allowing adjacent springs to be formed as close together in the array as physically possible, while offering an uncompromised useful deflection range.

Figure 6:
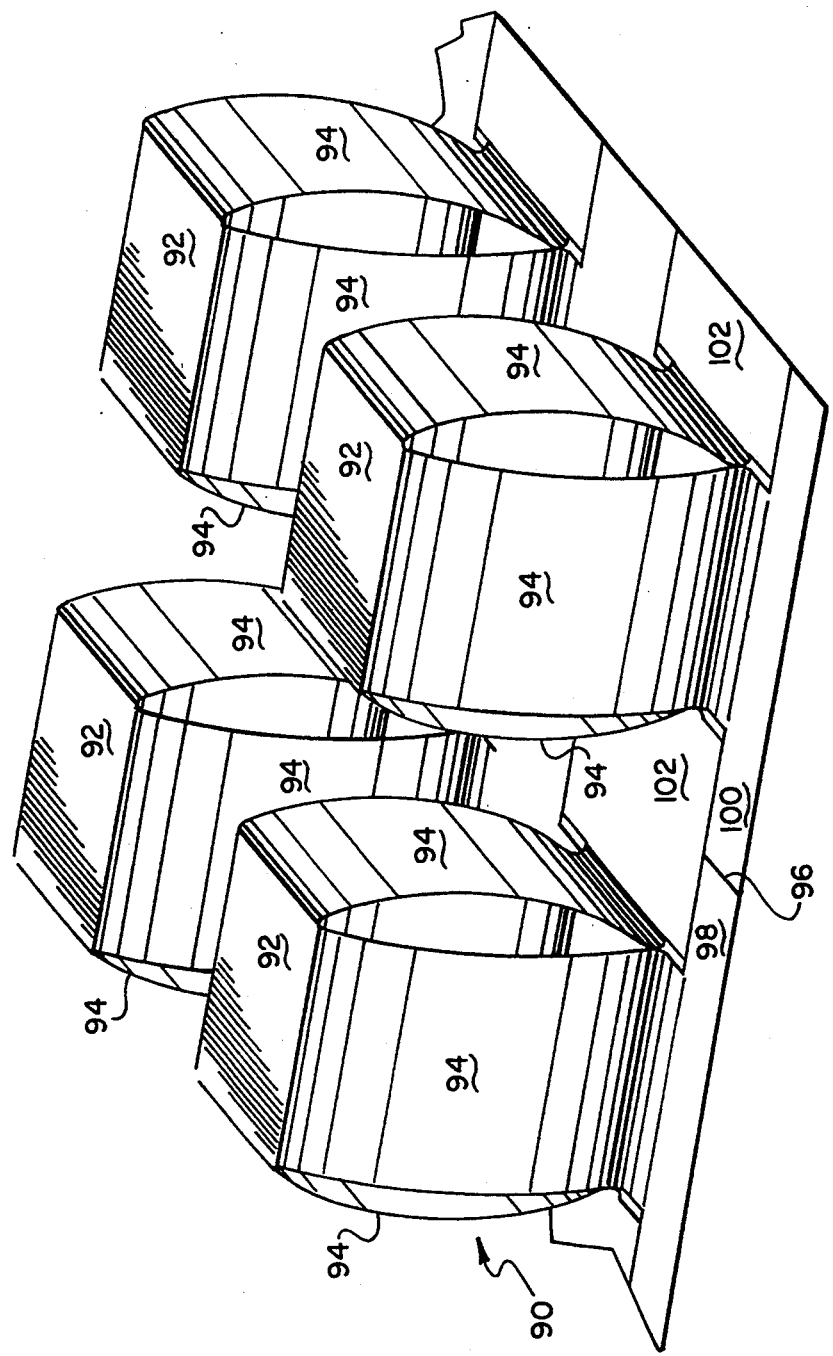
FIG. 6 is a perspective view of a segment of an array of springs constructed in accordance with a fourth embodiment of the invention.

To increase the amount of resistance force, one can increase leg width or material thickness. However, increasing leg width may not be possible due to design constraints, and increasing thickness tends to detract from the desired performance characteristics. In such situations, a high performance embodiment, illustrated in FIG. 6, utilizing four legs instead of the normal two may be used. This requires a larger top member 92. The four side members 94 may either be identical in width or, alternatively, opposing side members 94 may be varied to obtain any desired force. When compressed, the four sides will bow in a fashion similar to compressing an inflated balloon. The base may be a series of butt joints 96 or may overlap as bases 98 and 100 overlap and overlie base 102.

Each individual spring of the present invention, for example as illustrated in FIGS. 1, 3, 4A, 4B, 5, 6 and 8, may also be described as comprising a spring-supporting base, upwardly extending side bands, each side band having a proximal end joined to the base by a concave transitional arc, mid-points of the concave arcs all lying in a first plane, each side band also having a distal end, and a top portion joined at a perimeter of the top portion by a convex transitional arc to a distal end of each side band, mid-points of the convex transitional arcs all lying in a second plane parallel to the first plane, such that each convex transitional arc is also parallel to the concave transitional arc of the same side band. The side bands and the top portion are all formed of generally planar flexible sheet material.

The disclosure of the present invention teaches both a spring structure for non-linear force versus deflection, and a folded sheet array of springs. For various applications, each may be separately and independently useful. Furthermore, these two can be synergistically combined. An array of these springs, as shown in FIGS. 1, 3 and 4, allows simultaneously a very dense array and a wide deflection range with near-constant force. Also, this structure for a non-linear spring is highly compatible with a printed-circuit-like construction for a dense array of springs. This synergism might be better appreciated by contrast with the prior art.

Prior art springs could not simultaneously achieve a dense array and near constant force over a wide deflection range. A printed circuit array of planar cantilever springs requires short levers to achieve high density and therefore cannot provide a wide deflection range with near-constant force. An array of Bellvelle washers can provide large density but only a narrow range of near constant force. A common tape measure contains a coiled metal tape which may be considered a spring with a constant tensile force over a very wide range of extension. This spring is incompatible with a dense array. Still other designs for buckling beam springs are not compatible with an array sheet structure and not compatible with fabrication like a printed circuit. By contrast, the two parts of the present invention synergistically achieve what prior art could not achieve.

A goal of the present invention is near constant force, and zero lateral motion and force. In other applications, the goal may be to enhance and control the variation in compressive force, and/or to enhance and control sideways motion and sideways force. This can be done by shaping the legs of the springs. During deflection, this could provide snap action, bistable motion or other types of response. Some versions might be valuable for keyboards or other applications.

What is claimed is:

1. A unitary buckling beam deflection spring structured solely by patterning, cutting, and folding a single sheet of generally planar flexible sheet metal, said spring comprising:
   a spring-supporting base;
   four upwardly extending generally rectangular side bands, each side band having a proximal end joined to the base by a concave transitional arc, mid-points of the concave arcs all lying in a first plane, each side band having a distal end; and
   a generally square top portion joined at a perimeter thereof by a convex transitional arc to a distal end of each side band, mid-points of the convex transitional arcs all lying in a second plane parallel to the first plane.

2. A spring according to claim 1, wherein the top portion is perforated.

3. A spring according to claim 1, wherein the ratio of side height to side width of the spring ranges between about 1.5:1 and 4:1.

4. A spring according to claim 1, wherein the ratio of side height of the spring to sheet material thickness is approximately 150:1.

5. A cooperative spring arrangement of a plurality of geometrically arranged rows and columns of identical functionally distinct unitary buckling beam deflection springs, said arrangement structured solely by patterning, cutting and folding a single sheet of generally planar flexible sheet metal, each spring of said arrangement comprising:

a spring-supporting base;

four upwardly extending generally rectangular side bands, each side band having a proximal end joined to the base by a concave transitional arc, mid-points of the concave arcs all lying in a first plane, each side band having a distal end; and a generally square top portion joined at a perimeter thereof by two pairs of opposed parallel convex transitional arcs to a distal end of each side band, mid-points of the convex transitional arcs all lying in a second plane parallel to the first plane.

6. A cooperative spring arrangement according to claim 5, wherein the base is further rigidified by a supporting underlayment.

7. A cooperative arrangement according to claim 5, wherein the top portion is perforated.

8. A cooperative spring arrangement according to claim 5, wherein the ratio of side height of each spring to sheet material thickness is approximately 150:1.

9. A cooperative spring arrangement according to claim 5, wherein the ratio of side height to side width of each spring ranges between 1.5:1 and about 4:1.

10. A unitary buckling beam deflection spring formed of a single sheet of generally planar flexible sheet material comprising:

a spring-supporting base;

upwardly extending generally planar side members generally outwardly bowed relative to each other, each side member having a proximal end joined to the base, each side member having a distal end wherein a first side member has a central cut-out region defining two perimeter parallel legs, and wherein a second side member has two perimeter parallel cut-out regions defining a central leg of a width slightly less than a width of the central cut-out region; and a top portion joining the distal ends of the side members, said top portion being generally planar and generally parallel to the base.

11. A cooperative spring arrangement of an identical plurality of geometrically arranged rows and columns of a functionally distinct unitary buckling beam deflection spring according to claim 10, wherein said cooperative arrangement is formed of a single sheet of generally planar flexible sheet material.

12. A unitary buckling beam deflection spring comprising:

a spring-supporting base;

upwardly extending side bands generally outwardly bowed relative to each other, each side band having a proximal end joined to the base, each side band having a distal end, wherein a first side band has a central cut-out region defining two perimeter parallel legs, and wherein a second side band has two perimeter parallel cut-out regions defining a central leg of a width slightly less than a width of the central cut-out region; and a top portion joining the distal ends of the side bands;

said buckling beam deflection spring formed of a single sheet of generally planar flexible sheet material.

13. A spring according to claim 12, wherein said cut-out regions extend from the proximal end nearly to the distal end of each side bands.

14. A spring according to claim 13, wherein each side band has a generally S-shaped profile, which profiles are mirror images to each other, the first and second side bands positioned such that the central region of the second side band projects between the two legs of the first side band so that the profiles intersect, thereby forming a figure-8 silhouette to the spring.

15. A cooperative spring arrangement of a plurality of geometrically arranged rows and columns of identical functionally distinct unitary buckling beam deflection springs, each spring comprising:

a spring-supporting base;

upwardly extending generally planar side bands, generally outwardly bowed relative to each other, each side band having a proximal end joined to the base, each side band having a distal end, wherein a first side band has a central cut-out region defining two perimeter parallel legs, and wherein a second side band has two perimeter parallel cut-out regions defining a central leg of a width slightly less than a width of the central cut-out region; and a generally planar top portion joining the distal ends of the side bands, the top portion being generally parallel to the base;

said cooperative spring arrangement formed of a single sheet of generally planar flexible sheet material.

16. A cooperative spring arrangement according to claim 15, wherein said cut-out regions extend from the proximal end nearly to the distal end of each side member.

17. A cooperative spring arrangement according to claim 16, wherein each side band has a generally S-shaped profile, which profiles are mirror images to each other, the first and second side bands positioned such that the central region of the second side band protrudes between the two legs of the first side band so that the profiles intersect, thereby forming a figure-8 silhouette to the spring.

18. A unitary buckling beam deflection spring comprising:

a spring-supporting base;

upwardly extending side bands, each side band having a proximal end joined to the base by a concave transitional arc, mid-points of the concave arcs all lying in a first plane, each side band having a distal end, wherein a first side band has a central cut-out region defining two perimeter parallel legs, and wherein a second side band has two perimeter parallel cut-out regions defining a central leg of a width slightly less than a width of the central cut-out region; and a top portion joined at a perimeter thereof by a convex transitional arc to a distal end of each side band, mid-points of the convex transitional arcs all lying in a second plane parallel to the first plane;

said buckling beam deflection spring formed of a single sheet of generally planar flexible sheet material.

19. A spring according to claim 18, wherein said cut-out regions extend from the proximal end nearly to the distal end of each side band.

20. A spring according to claim 19, wherein each side band has a generally S-shaped profile, which profiles are mirror images to each other, the first and second side bands positioned such that the central region of the second side band projects between the two legs of the first side band so that the profiles intersect, thereby forming a figure-8 silhouette to the spring.

21. A cooperative spring arrangement of a plurality of geometrically arranged rows and columns of identical functionally distinct unitary buckling beam deflection springs, each spring comprising:

a spring-supporting base;

upwardly extending side bands, each side band having a proximal end joined to the base by a concave transitional arc, mid-points of the concave arcs all lying in a first plane, each side band having a distal end, wherein a first side band has a central cut-out region defining two perimeter parallel legs, and wherein a second side band has two perimeter parallel cut-out regions defining a central leg of a width slightly less than a width of the central cut-out region; and a top portion joined at a perimeter thereof by a convex transitional arc to a distal end of each side band, mid-points of the convex transitional arcs all lying in a second plane parallel to the first plane;

said cooperative spring arrangement formed of a single sheet of generally planar flexible sheet material.

22. A cooperative spring arrangement according to claim 21, wherein said cut-out regions extend from the proximal end to less than the distal end of each side band.

23. A cooperative spring arrangement according to claim 22, wherein each side band has a generally S-shaped profile, which profiles are mirror images to each other, the first and second side bands positioned such that the central region of the second side band protrudes between the two legs of the first side band so that the profiles intersect, thereby forming a figure-8 silhouette to the spring.

* * * * *

UNITED STATES PATENT AND TRADEMARK OFFICE
CERTIFICATE OF CORRECTION

PATENT NO. : 5,409,200
DATED : Apr. 25, 1995
INVENTOR(S) : Arthur R. Zingher and Anthony J. Liberko It is certified that error appears in the above-identified patent and that said Letters Patent is hereby corrected as shown below:

Column 7, Line 43: After the word "end" insert --,--

Signed and Sealed this

Twenty-sixth Day of September, 1995

Attest:

BRUCE LEHMAN

*Attesting Officer*  *Commissioner of Patents and Trademarks*